(12) United States Patent
Nguyen et al.

(10) Patent No.: US 6,742,389 B2
(45) Date of Patent: Jun. 1, 2004

(54) FILTER-BASED METHOD AND SYSTEM FOR MEASURING ANGULAR SPEED OF AN OBJECT

(75) Inventors: Clark T.-C. Nguyen, Ann Arbor, MI (US); Mustafa U. Demirci, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 58 days.

(21) Appl. No.: 10/055,210

(22) Filed: Jan. 23, 2002

(65) Prior Publication Data

US 2003/0037614 A1 Feb. 27, 2003

Related U.S. Application Data

(60) Provisional application No. 60/264,048, filed on Jan. 24, 2001.

(51) Int. Cl.$^7$ ................................................. G01P 9/04
(52) U.S. Cl. ................................................... 73/504.12
(58) Field of Search ........................ 73/504.12, 504.14, 73/504.16

(56) References Cited

U.S. PATENT DOCUMENTS

| | | |
|---|---|---|
| 3,839,915 A | 10/1974 | Schlitt |
| 4,654,663 A | 3/1987 | Alsenz et al. |
| 4,699,006 A | 10/1987 | Boxenhorn |
| 5,197,331 A | 3/1993 | Oikawa |
| 5,455,547 A | 10/1995 | Lin et al. |
| 5,604,311 A | 2/1997 | Kumar et al. |
| 5,604,312 A | 2/1997 | Lutz |
| 5,635,638 A | 6/1997 | Geen |
| 5,728,936 A | 3/1998 | Lutz |
| 5,889,208 A | 3/1999 | Nose |
| 5,895,850 A | 4/1999 | Buestgens |
| 5,895,852 A | 4/1999 | Moriya et al. |
| 5,918,280 A | 6/1999 | Gang et al. |
| 5,945,599 A | 8/1999 | Fujiyoshi et al. |
| 5,945,600 A | 8/1999 | Touge et al. |
| 5,955,668 A | 9/1999 | Hsu et al. |
| 5,969,225 A | 10/1999 | Kobayashi |
| 5,992,233 A | 11/1999 | Clark |
| 6,023,972 A | 2/2000 | Hulsing, II |
| 6,044,707 A | 4/2000 | Kato |
| 6,067,858 A | 5/2000 | Clark et al. |
| 6,089,089 A | 7/2000 | Hsu |
| 6,214,243 B1 | 4/2001 | Muenzel et al. |
| 6,250,156 B1 * | 6/2001 | Seshia et al. ............ 73/504.12 |
| 6,349,597 B1 | 2/2002 | Folkmer et al. |

FOREIGN PATENT DOCUMENTS

| | | |
|---|---|---|
| DE | 196 41 284 C1 | 5/1998 |
| EP | 0 764 828 A1 | 3/1997 |
| EP | 0 990 872 A1 | 4/2000 |

\* cited by examiner

Primary Examiner—John E. Chapman
(74) Attorney, Agent, or Firm—Brooks Kushman P.C.

(57) ABSTRACT

A method and system for measuring angular speed of an object uses a micromechanical filter apparatus and allows Q-multiplication in both drive and sense modes. The invention takes advantage of the constant amplitude region of a filter spectrum within a passband of the filter apparatus to sense with a constant scaling factor that is independent of frequency variations with the passband. Thus, the system has much less sensitivity to drive mode resonance frequency shifts due to temperature variations, fabrication non-idealities and aging. The system senses angular rate or speed at resonance, which results in a great improvement over conventional gyroscopes operated off-resonance.

22 Claims, 8 Drawing Sheets

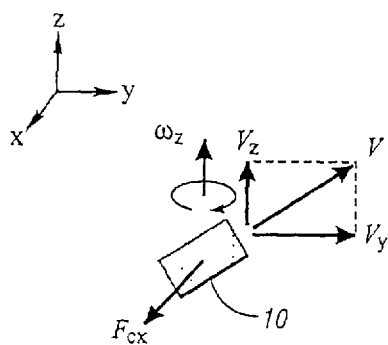
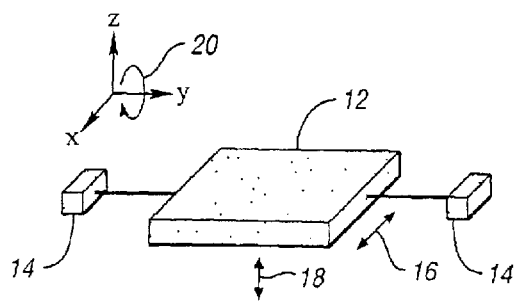
Fig. 1
*(PRIOR ART)*
Fig. 2
*(PRIOR ART)*
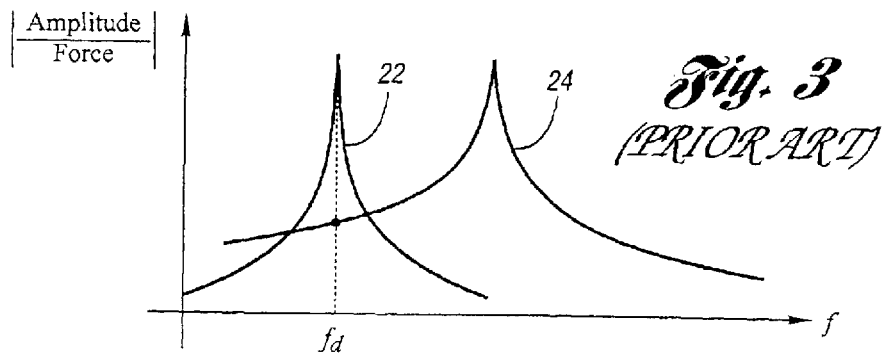
Fig. 3
*(PRIOR ART)*
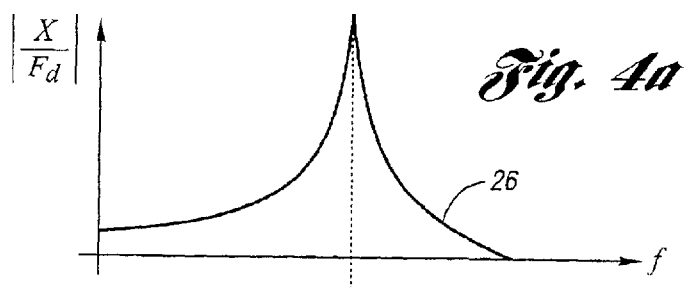
Fig. 4a
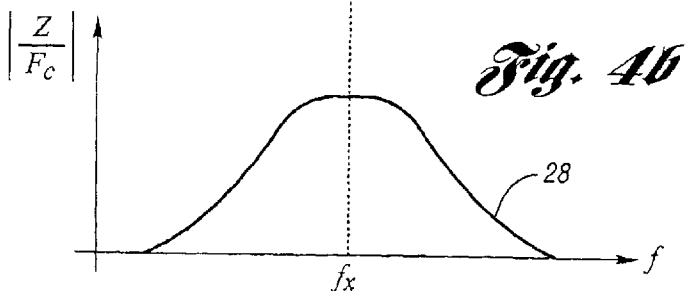
Fig. 4b

FILTER-BASED METHOD AND SYSTEM FOR MEASURING ANGULAR SPEED OF AN OBJECT

CROSS-REFERENCE TO RELATED APPLICATION

This application claims the benefit of U.S. provisional application Serial No. 60/264,048, filed Jan. 24, 2001 and entitled "Filter-Based Gyroscope."

BACKGROUND OF THE INVENTION

1. Field of the Invention

This invention relates to filter-based methods and systems for measuring angular speed of an object.

2. Background Art

A gyroscope is an angular rate sensor that measures angular speed about a specific axis. Gyroscopes with high reliability and low cost are required in specific applications, such as inertial navigation in the automotive industry. There has been considerable interest in developing micromachined angular rate sensors to satisfy these requirements because of their low cost and small size. To improve the sensitivity of a gyroscope, it is best to match the resonance frequencies in drive and detect modes. However, due to production variations and temperature dependencies, these frequencies tend to deviate from a matched condition.

Vibrating Gyroscopes

The principle of operation for an angular rate sensor is based on the Coriolis effect. In particular, when a moving particle is rotated, Coriolis forces are generated due to conservation of linear momentum. The Coriolis force is given by:

$$F_c = 2m(\omega \times v), \quad (1)$$

where m is the mass of the particle, $\omega$ is its rotate rate vector, and v is its linear velocity. The rotation rate vector, denoted by $\omega$, is normal to the plane of rotation. The Coriolis force is generated in the rotating frame.

Due to the cross product in (1), $F_{cx}$, the Coriolis force along the x-axis, only depends on the velocity component along the plane of rotation as seen in FIG. 1. Hence, the resulting Coriolis force is directly proportional to the angular rotation of the object 10 around the axis perpendicular to the velocity of the object 10 with $V_z$, velocity component normal to plane of rotation and $V_y$, velocity component on plane of rotation. The angular rate can be measured by detecting the magnitude of this force.

In vibratory gyroscopes, the linear velocity component is generated by driving a mechanical structure into resonance vibration. When the structure is rotated, the Coriolis force induces vibration perpendicular to the reference vibration with the same frequency. The reference and Coriolis-induced vibration modes are perpendicular to each other and together display an elliptical motion. The angular rate is measured by sensing the amplitude of the induced oscillation component, which is proportional to the Coriolis force (hence, proportional to the rotation rate).

The amplitude of the Coriolis-induced sense vibration is generally smaller than the reference vibration. To be able to detect the induced vibration, the reference oscillation amplitude should be kept sufficiently large. This is accomplished by operating the structure at resonance. This takes advantage of the quality factor (Q) amplification near the resonance frequency.

For best performance, the reference and induced vibrations should have equal resonance frequencies. However, it is very difficult to match the two frequencies practically. These frequencies depend on several parameters such as mechanical structure and temperature. Mechanical design limitations and temperature shifts will cause mismatch in resonance frequencies. This small mismatch will cause a large variation in the sensitivity of angular rate sensor.

Another disadvantage of designing the sense mode at resonance is the limited operation bandwidth. This is demonstrated by time domain analysis of the prior art system illustrated in FIG. 2. In FIG. 2, a movable mass 12 is supported by anchors 14.

The reference oscillation along the x-axis, indicated at 16, with amplitude $X_o$ and frequency $\omega_x$ is given as a function of time by:

$$x(t) = X_o \sin \omega_x t. \quad (2)$$

The rotation applied around the y-axis, as indicated at 20, induces a Coriolis force along the z-axis, indicated at 18, which is given by:

$$F_c = 2m\Omega_y(t) \times \dot{x}(t) \quad (3)$$
$$= 2m\Omega_y(t)X_o\omega_x\cos\omega_x t,$$

where m is the mass of the structure and $\Omega_y(t)$ is the angular frequency of the rotation as a function of time. In Equation (3), it is seen that the Coriolis force is an amplitude-modulated signal where the carrier frequency is the reference vibration frequency. Thus, the resulting Coriolis force is a dual sideband signal centered on the reference frequency, with a bandwidth twice the bandwidth of the input angular rate. However, if the sense mode is at resonance, because of the sharp response with high Q, the sense oscillation will not have the same bandwidth as the Coriolis force signal. The bandwidth of the detected angular rate will be much smaller than the input rate.

For the reasons mentioned above, the sense mode is in general designed to operate at a much lower frequency than resonance. FIG. 3 shows example drive and sense mode spectra 22 and 24, respectively, for conventional gyroscope designs. Here, the resonance frequency of the sense mode is much higher than the reference frequency, yielding a smoother frequency region for the sense mode. This improves the bandwidth and temperature stability of the sensor, but results in a significant decrease in the sensitivity compared to a gyroscope that would be operated at resonance.

U.S. Pat. No. 5,945,600 to Touge et al. shows a low profile angular rate sensor having a first comb-type drive resonator or oscillator coupled to a second comb-type resonator or oscillator via a movable electrode. The movable electrode detects the vertical movement or deflection of the oscillations along the Z-axis after the input of a Coriolis force. The resonant frequencies of the oscillations in the X and Z directions are the same.

U.S. Pat. No. 5,945,599 to Fujiyoshi et al. discloses a resonance-type angular velocity sensor in which capacitive-type electrodes are used to detect the direction of a Coriolis force. The exciting frequency is adjustable.

U.S. Pat. No. 5,895,850 to Buestgens discloses a micro-mechanical resonator or a vibration gyrometer in which a pair of spaced resonating masses are joined via a coupling mass.

U.S. Pat. No. 5,604,311 to Kumar et al. discloses a Coriolis effect rotation rate sensor and method including a tuning mechanism for the in-situ tuning of resonant frequencies.

U.S. Pat. No. 5,889,208 to Nose; U.S. Pat. Nos. 5,895,852 and 6,070,463 to Moriya et al.; U.S. Pat. No. 5,918,280 to Gang et al.; U.S. Pat. No. 5,969,225 to Kobayashi; U.S. Pat. No. 5,992,233 to Clark; U.S. Pat. No. 6,044,707 to Kato; and U.S. Pat. No. 6,067,858 to Clark et al. all disclose micromechanical vibratory rate gyroscopes or angular rate sensors per se in which detection along the Z-axis is facilitated.

U.S. Pat. No. 3,839,915 to Schlitt and U.S. Pat. No. 5,197,331 to Oikawa both disclose oscillating angular rate sensors employing electronic filtering capability.

Other relevant U.S. patents include U.S. Pat. Nos. 5,455,547; 4,654,663; 5,604,312; 5,635,638; 5,728,936; 5,955,668; 6,023,972; 6,089,089; and 6,214,243.

SUMMARY OF THE INVENTION

An object of the present invention is to provide a filter-based method and system for measuring angular speed of an object which is inexpensive and highly reliable.

Another object of the present invention is to provide a filter-based method and system for measuring angular speed of an object which has increased stability and sensitivity.

In carrying out the above objects and other objects of the present invention, a method for measuring angular speed of an object is provided. The method includes providing a micromechanical filter apparatus including one or more intercoupled micromechanical elements including a first resonator having a first resonance frequency formed on a substrate and having a drive mode response in a drive mode wherein the filter apparatus has a filter response in a sense mode. The method further includes coupling the substrate to the object so that the filter apparatus rotates with the object about a first axis. The method also includes driving the first resonator in the drive mode so that the first resonator vibrates along a second axis at a reference vibration and generates a Coriolis force which causes one of the other elements of the filter apparatus to vibrate along a third axis at an induced vibration. The method further includes sensing the induced vibration in the sense mode to obtain a corresponding output signal which represents the angular speed of the object about the first axis.

The micromechanical elements may include a second resonator having a second resonance frequency wherein the resonance frequencies are substantially the same in the drive and sense modes.

The filter response in the sense mode may have a substantially constant amplitude region for a passband of frequencies including the resonance frequencies. The filter response of the filter apparatus in the sense mode may be substantially constant about the resonance frequencies.

The micromechanical elements may also include a second resonator coupled to the first resonator wherein the first resonator is driven during the step of driving in the drive mode so that the first resonator vibrates along the second axis at the reference vibration and generates the Coriolis force to cause the second resonator to vibrate along the third axis at the induced vibration.

The resonators may be platform, disk or wineglass resonators.

The first resonator may be comb-driven.

The step of sensing may be performed capacitively.

Q-multiplication may be attained in both the drive and sense modes.

The resonators may be polysilicon resonators.

The micromechanical elements may further include a mechanical spring for coupling the resonators together.

The filter apparatus may be a wide passband filter apparatus wherein the filter response is a wide passband filter response.

Further in carrying out the above objects and other objects of the present invention, a system is provided for measuring angular speed of an object. The system includes a substrate and a micromechanical filter apparatus including one or more intercoupled micromechanical elements including a first resonator having a first resonance frequency formed on the substrate and having a drive mode response in a drive mode wherein the filter apparatus has a filter response in a sense mode. The filter apparatus rotates with the object about a first axis when the substrate is coupled to the object and the object is rotated. The system further includes means for driving the first resonator in the drive mode so that the first resonator vibrates along a second axis at a reference vibration and generates a Coriolis force which causes one of the other elements of the filter apparatus to vibrate along a third axis at an induced vibration. The system further includes means for sensing the induced vibration in the sense mode to obtain a corresponding output signal which represents the angular speed of the object about the first axis.

The micromechanical elements may also include a second resonator coupled to the first resonator wherein the first resonator is driven by the means for driving in the drive mode so that the first resonator vibrates along the second axis at the reference vibration and generates the Coriolis force to cause the second resonator to vibrate along the third axis at the induced vibration.

The means for sensing may include a capacitor for capacitively sensing the induced vibration.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic view of an object with a mass which rotates at a rotation rate in a plane with respect to a coordinate system and various vectors which show the effect of rotation on the object;

FIG. 2 is a schematic view of a prior art system which detects angular rate;

FIG. 3 are graphs which illustrate drive (i.e., reference) and sense mode spectra or responses for prior art gyroscopes;

FIGS. 4a and 4b are graphs which show an example drive (reference) mode spectrum and a filter or sense spectrum, respectively, for a gyroscope system using a filter of the present invention;

DETAILED DESCRIPTION OF THE PREFERRED EMBODIMENTS

The present invention is a filter-based method and system for measuring angular speed of an object. The invention uses an angular rate sensor having a mechanical filter structure that takes advantage of its filter spectrum or frequency response in a sense mode to achieve superior stability over conventional gyroscopes. The angular rate sensor uses its filter structure to sense the Coriolis force at resonance. A vibratory element is designed to generate a reference oscillation in drive mode, and to operate as a mechanical filter in the sense mode. FIG. 4b shows an example filter spectrum at 28 and FIG. 4a shows a corresponding drive (reference) mode spectrum 26 for the sensor of the present invention. The filter spectrum has a flat shape in the passband, large enough to cover the bandwidth of the input rotation. The reference oscillation frequency is designed within this passband to achieve the maximum amplification in the sense mode.

The gyroscope using a filter response in sense mode has a higher sensitivity compared to the conventional angular rate sensors operated off-resonance. This high sensitivity comes from the Q amplification of the Coriolis force within the filter passband. This is similar to sensing the induced vibration in a conventional gyroscope at resonance. However, the filter has a larger bandwidth compared to single resonator, so it has a lower Q. But this still gives a much higher sensitivity than operating the same structure away from resonance frequency.

Figure 5:
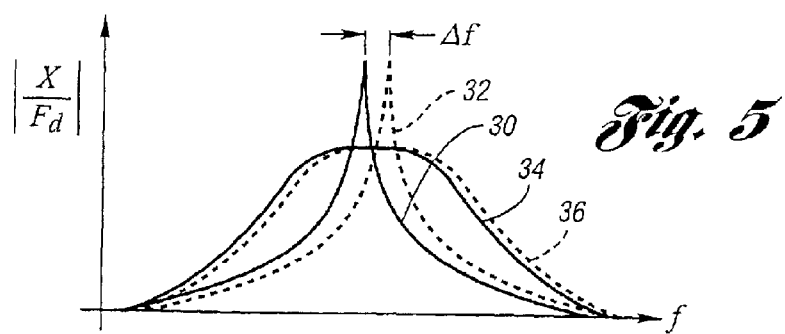
FIG. 5 are graphs which show the effect of shift in reference frequency due to temperature variation.

The use of the filter spectrum or response also improves the stability of the sensor. This is because of the relatively constant passband region of the filter. As seen in FIG. 5, a shift in the reference frequency (i.e., Δf from 30 to 32) due to a temperature change does not change the induced oscillation amplitude, hence the gyroscope sensitivity is not affected.

Furthermore, the filter structure results in an angular rate sensor with sufficient bandwidth of detection. As mentioned above, the Coriolis force is an amplitude-modulated signal with a spectrum spread around the reference frequency. This shape will be preserved as a result of the filter-shaped sense mode.

Structure and Design of the Filter-Based Angular Rate Sensor

The gyroscope of the present invention is designed very similar to comb-driven, on-chip micromechanical resonators generally of the type shown in U.S. Pat. No. 5,455,547. These resonators have very high quality factors. Their resonance frequency ranges between 20 kHz to 500 kHz. These polysilicon resonators have very low resonance frequency temperature coefficients. Furthermore, micromechanical filters have already been demonstrated using two or more resonators of this type. All these properties motivate consideration of these resonators for angular rate sensing. However, it is to be understood that other resonators may also be used such as disk or wineglass resonators.

Figure 6:
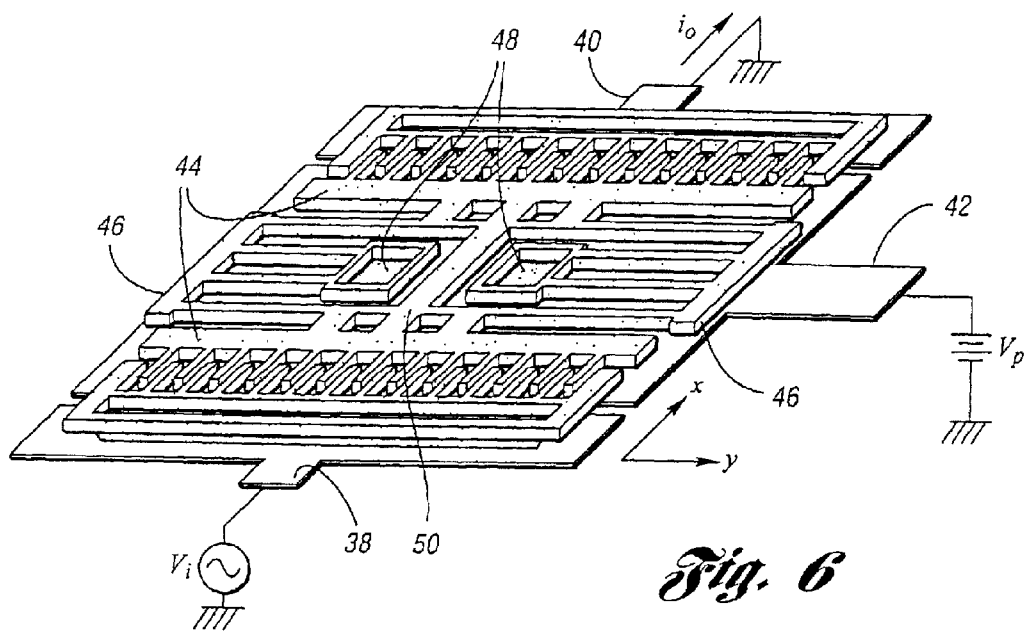
FIG. 6 is a schematic perspective view of a comb-driven micromechanical resonator of a filter of the present invention.

FIG. 6 presents a perspective view of a comb-driven micromechanical resonator, including an input electrode 38, an output electrode 40, a DC-bias electrode 42, comb transducers 44, trusses 46, anchors 48 and a shuttle mass 50. The resonator is suspended 2 μm above the ground plane via the anchors 48. The comb fingers constitute the capacitive transducers that convert between electrical signals and mechanical vibrations. The resonator is driven by a sinusoidal voltage applied to the input comb transducer fingers via the input electrode 38 and a DC bias voltage connected to the movable shuttle 50 via the DC bias electrode 42. The resonance frequency of the structure is given by the expression:

$$f_x = \frac{1}{2\pi}\left[\frac{4Eh(W_b/L_a)^3}{(1+\beta^3)m_r}\right]^{1/2} \tag{4}$$

where E is the Young's modulus, h is the resonator thickness, $W_b$ is the beam width, and $L_a$ is the outer beam length. The values of β and $m_r$ are given as:

$$\beta = \frac{L_s}{L_a} \tag{5}$$

$$m_r = M_P + \frac{M_t}{(1+\beta^3)^2} + \frac{13}{35(1+\beta^3)^2}M_{ba} + \left[\frac{1}{(1+\beta^3)} + \frac{13\beta^6}{35(1+\beta^3)^2}\right]M_{bs}, \tag{6}$$

where $L_s$ is the inner beam length; $M_P$ is the mass of the shuttle; $M_p$ $M_a$, and $M_{bs}$ are the total folding truss, inner beam, and outer beam masses.

Figure 7:
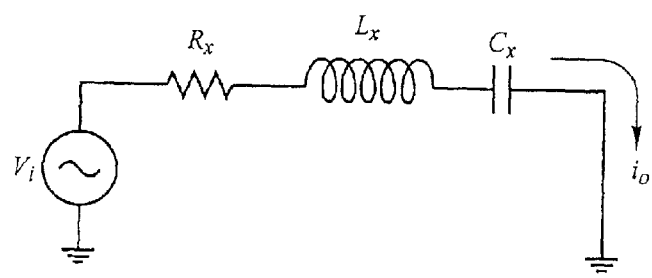
FIG. 7 is an equivalent circuit diagram for the resonator of FIG. 6.

FIG. 7 shows the equivalent circuit of the structure. Equations for the circuit elements are as follows:

$$R_x = \frac{\sqrt{k_r m_r}}{Q\eta^2} \quad C_x = \frac{\eta^2}{k_r}$$

$$L_x = \frac{m_r}{\eta^2} \quad \eta = V_p \frac{\partial C_x}{\partial x}$$

where $R_x$, $C_x$, $L_x$, and η are the equivalent resistance, capacitance, inductance and electromechanical coupling, respectively. In the equations, $m_r$ and $k_r$ are the effective mass and coupling spring of the resonator, respectively.

Gyroscope Structure and Operation

Figure 8:
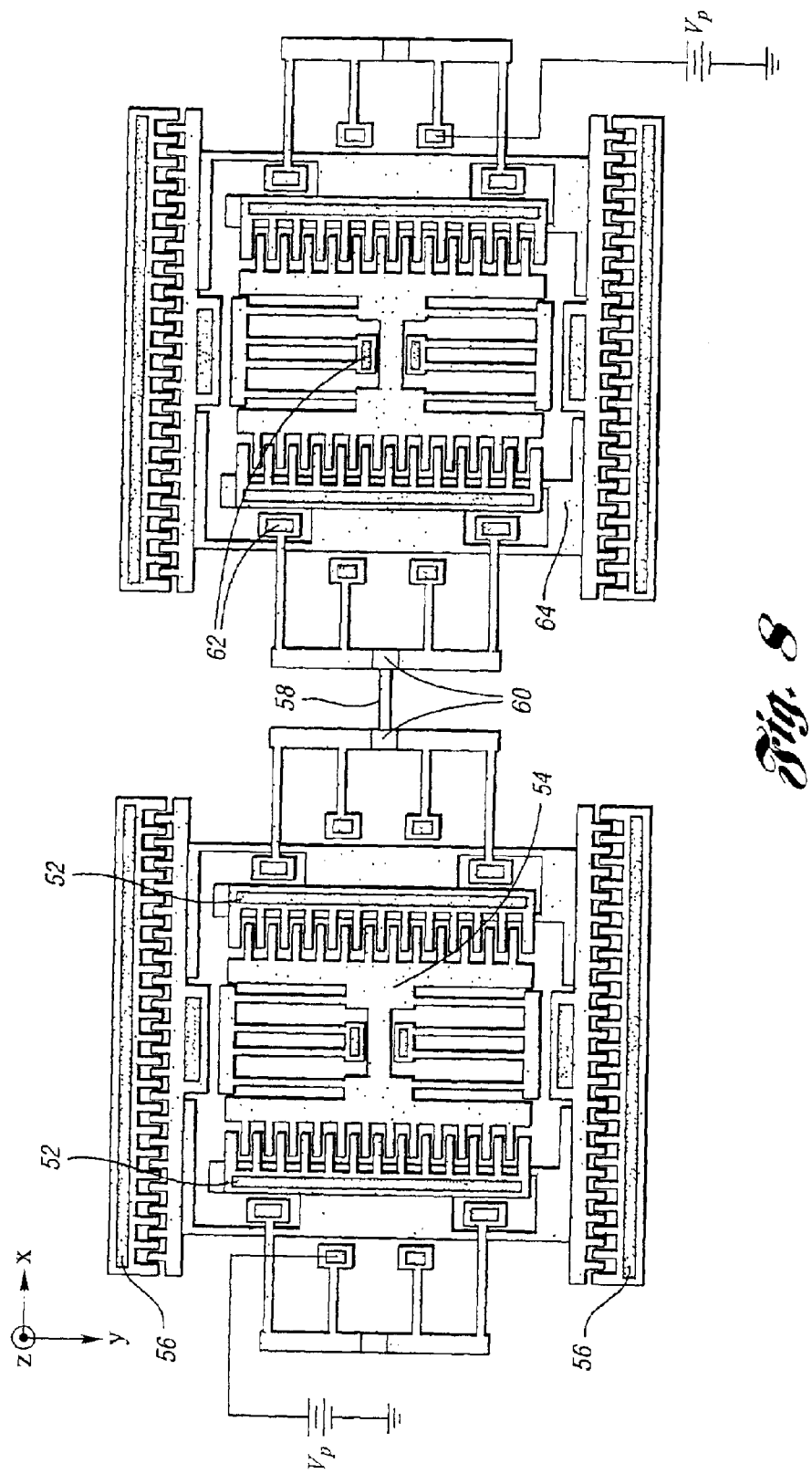
FIG. 8 is a top schematic view of a filter-based angular rate or speed sensor system of the present invention.

FIG. 8 shows the structure of the designed angular rate sensor, including drive electrodes 52, a drive resonator 54, sense electrodes 56, insulating regions 60, anchors 62 and platforms 64 which are resonators which can vibrate along the y-axis. The structure consists of two comb-driven platform resonators 64 coupled by a mechanical spring or coupling beam 58 which operates as the Sense mode, and single comb-driven resonators 54 on each platform 64 operating as the Drive mode. The drive mode resonators 54 are movable along the x-direction, and the sense mode platforms 64 are movable along the y-direction. The platform resonators are suspended above the substrate via the anchors 62.

The supporting beams of the platforms 64 have two functions. First, they determined the frequency of the platform resonators (by choosing proper beam dimensions) hence the sense mode. Second, they provide the electrical connections to the drive mode resonator on top of the platform and the sense mode electrode. The insulating regions 60 in the middle of the folding trusses of the platform resonators isolate the electrical connections to the drive and sense electrodes. These beams are connected to the electrodes on top of the platform. These electrodes not only serve as the ground plane for the drive mode resonators, they also route the electrical connections from the platform beams.

The reference vibration of the system is along the x-axis (drive mode). The Coriolis force is detected as deflections along the y-axis (sense mode). The system senses rotation about the z-axis.

The drive resonators are designed to vibrate with a high Q, at resonance, along x-axis. The system is designed as a mechanical filter in the sense mode (y-axis). The filter spectrum is achieved by mechanically coupling the two resonators at their folding trusses by the soft coupling spring 58. Note that the resonators are designed to have the same resonance frequency in x and y modes.

The reference vibration is generated by oscillating the first drive resonator on the first platform. This is achieved by exciting the transducer comb fingers (drive electrode) by a sinusoidal input, $V_i$, and applying a DC bias voltage, $V_p$, between the shuttle and the input ports. The amplitude of this oscillation is:

$$X = \frac{2N\varepsilon_o h}{d_{fd}} \frac{Q_d}{k_x} V_p V_i, \tag{7}$$

where N is the number of fingers in each drive resonator port, h is the structure thickness, $Q_d$ is the quality factor of the resonator in drive mode, $k_x$ is the lateral effective spring constant of the resonator, $d_{fd}$ is the gap between fingers of the drive electrode, and $\beta_o$ is the dielectric constant in vacuum.

When the system is rotated around the z-axis, Coriolis force is induced along the y-axis. This force excites the first platform resonator of the sense mode. The amplitude of this induced vibration is given by:

$$Y = \frac{Q_{eff} F_{cy}}{k_y} = \frac{\Omega_z Q_{eff}}{\pi f_o} X \tag{8}$$

where $F_{cy}$ is the Coriolis force generated along y direction, $k_y$ is the effective spring constant of the platform resonator, $\omega_z$ is the angular frequency of the rotation around z-axis, $f_o$ is the sense mode resonance frequency of the constituent resonators, $Q_{eff}$ is the effective quality factor of the sense mode filter, X is the reference vibration amplitude. The effective quality factor includes the effect of decrease in the output current due to the use of a filter configuration instead of a single resonator. Its value is given as:

$$Q_{eff} = \frac{Q_{filt}}{\sqrt{2}}, \tag{9}$$

$$Q_{filt} = \frac{f_o}{BW}, \tag{10}$$

where $Q_{filt}$ and BW are the quality factor and bandwidth of the micromechanical filter, respectively.

The induced vibration of the first platform resonator on the left is coupled to the second platform, hence the output is detected via the sense electrode of the second platform. The vibration creates a capacitance variation. As the overlap of comb fingers on the electrode and resonator acts as a parallel plate capacitor due to the applied DC bias, the capacitance variation produces a current at the output of the gyroscope. This current, which is proportional to the input rotation frequency, is given by:

$$I_{sense} = 2V_{py} \frac{\partial C}{\partial y} \Omega_z Q_{eff} X, \tag{11}$$

where $V_{py} = V_P$ is sense electrode to resonator DC bias voltage and $\partial C/\partial y$ is the sense electrode to resonator dynamic capacitance which is given by:

$$\frac{\partial C}{\partial y} = \frac{2N_f \varepsilon_o h}{d_{fs}}, \tag{12}$$

where $N_f$ is the number of fingers in sense port, $d_{fs}$, is the gap between fingers of the sense electrode.

Figure 9:
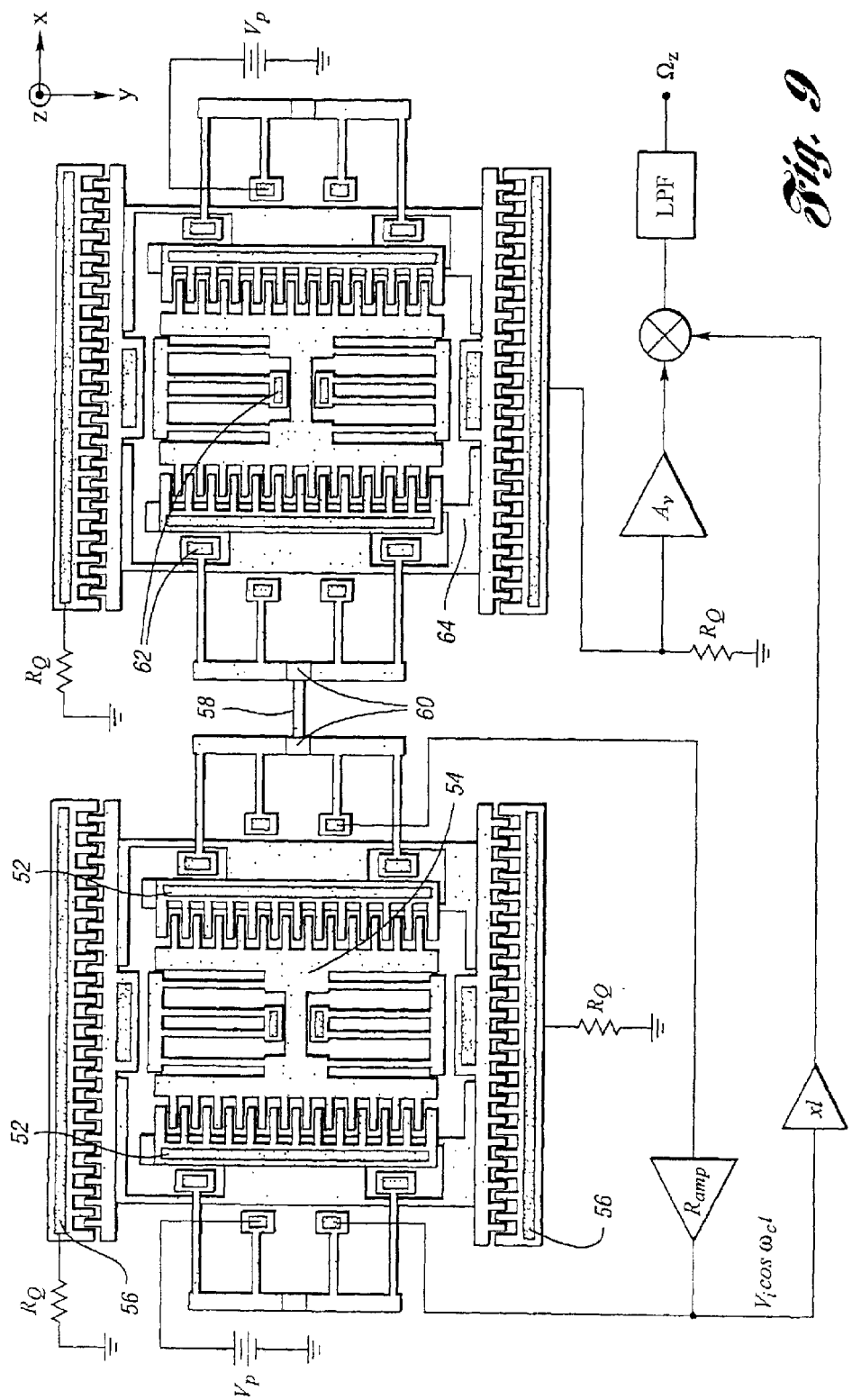
FIG. 9 is a view similar to FIG. 8 including detection or sense circuitry.

The rate output can be detected using the electronics shown in FIG. 9. The reference vibration is achieved by designing the drive mode as an oscillator. The transimpedance amplifier with gain $R_{amp}$ is connected between input and output ports of the comb-drive resonator on the first platform. This results in an oscillation of the drive resonator with constant amplitude.

The sense mode electrodes are terminated with Q-control resistors, $R_Q$, as part of the filter. The output current due to Coriolis force generates a proportional voltage on these resistors. Therefore, the angular rate output is measured by amplifying the voltage on $R_Q$. This voltage, at frequency $f_o$, is then demodulated to achieve the baseband angular rate signal. The mixer and lowpass filter are used for this purpose. The LPF bandwidth determines the detection bandwidth. The output voltage using this detection scheme is given by:

$$V_{out} \cong \frac{\omega_o X m_{rs}}{V_p \frac{\partial C}{\partial y}} \Omega_z, \tag{13}$$

where $m_{rs}$ is the effective mass of the sense mode resonators.

Figure 10:
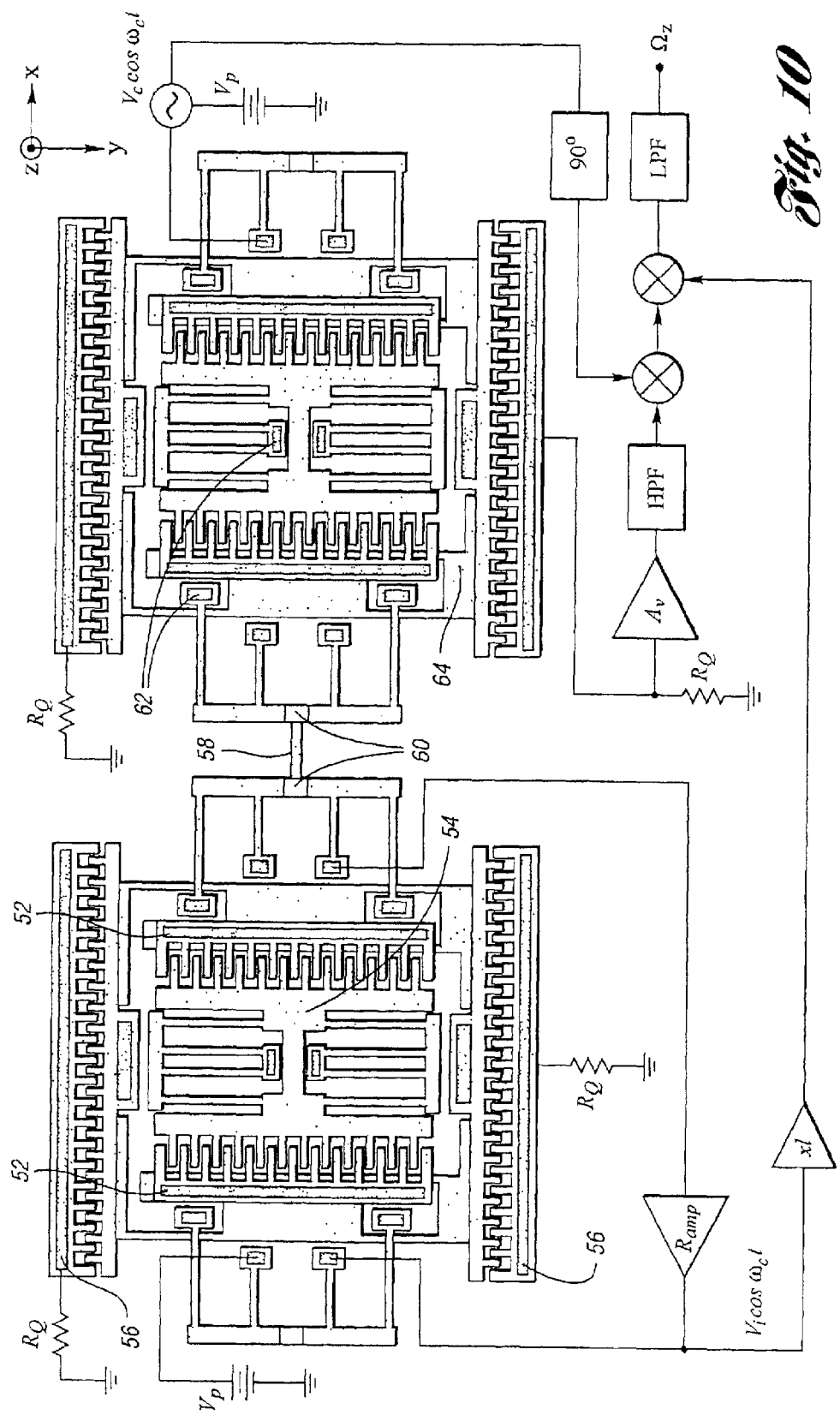
FIG. 10 is a view similar to FIG. 8 including detection or sense circuitry with carrier (EAM)

FIG. 10 shows the schematics for detection with a high frequency carrier signal. This system is used to eliminate any feedthrough current component at the sense mode output, which is in phase with the angular rate output. A high frequency signal is added to the DC bias applied to the second platform resonator. Then the output is high pass filtered and demodulated back to the resonance frequency $f_x$. The use of the carrier also improves the rate resolution of the gyroscope. The output voltage using this detection scheme is given as:

$$V_{out} \cong \frac{V_c \omega_c X m_{rs}}{V_p^2 \frac{\partial C}{\partial y}} \Omega_z, \tag{14}$$

where $V_c$ and $\omega_c$ are the carrier amplitude and frequencies, respectively.

Gyroscope Design

The first step of the design procedure is to match the drive and sense resonance frequencies of the resonators. The drive frequency only depends on the mechanical dimensions, whereas the sense frequency depends also on the applied tuning voltages ($V_t$) due to the electrical spring constant created by the tuning electrodes. These frequencies are calculated by using the following expressions:

$$f_x = \frac{1}{2\pi}\sqrt{\frac{k_x}{m_r}}, \tag{15}$$

$$f_y = \frac{1}{2\pi}\sqrt{\frac{k_{my} - k_e}{m_r}}, \tag{16}$$

where $k_{my}$ is the mechanical spring constant in the sense mode. The effective mass, $m_r$, is given by (6) and the mechanical and electrical spring constants are given by:

$$k_x = \frac{4Eh(W_{bD}/L_{bD})^3}{(1+\beta^3)}, \tag{17}$$

$$k_{my} = \frac{4Eh(W_{bS}/L_{bS})^3}{(1+\beta^3)}, \tag{18}$$

$$k_e = (V_p - V_t)^2 \cdot \frac{\varepsilon_0 A_{tune}}{d^3}, \tag{19}$$

where $W_{bD}$, $L_{bD}$ are the drive resonator beam width and lengths, $W_{bS}$ and $L_{bS}$ are the sense resonator beam width and lengths, h is the beam thickness, $A_{tune}$ is the tuning electrode area. The frequencies are matched by designing $k_{my}$ much higher than $k_x$ than tuning the frequencies by increasing $k_e$ by the applied bias.

The device dimensions should be chosen to maximize the output voltage given by (13) and (14) and to minimize the minimum detectable angular rate. The minimum detectable rate can be calculated by equating the output voltage to the output noise voltage and solving for the angular rate.

The next step is to design the mechanical filter of the sense mode by choosing the appropriate coupling beam dimensions. The micromechanical filter design method is used to determine the coupling beam dimensions and the Q-control resistor.

Figure 11:
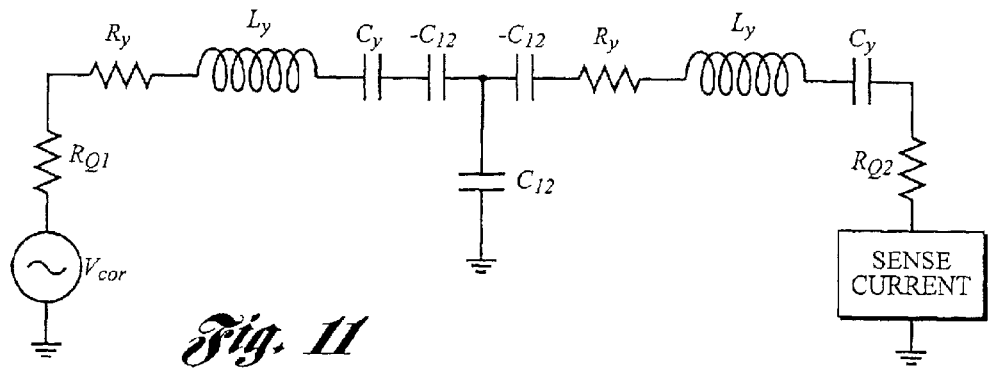
FIG. 11 is an equivalent circuit diagram for the vertical mode filter system of FIG. 8.

FIG. 11 presents the equivalent circuit of the filter. The component values are specified by the equations related to FIG. 7. The subscript y represents the fact that the filter operation is along the y-axis.

The element $C_{12}$ is determined by the coupling spring constant, $k_{s12}$. The value of $k_{s12}$ depends on the coupling beam dimensions:

$$k_{s12} = \frac{EI\alpha^3(\sin\alpha + \sinh\alpha)}{L_{12}^3(\cos\alpha\cosh\alpha - 1)}, \tag{20}$$

where $\alpha = L_{12}(\rho W_{12} h_{12} \omega_y^2/E/1)^{0.25}$; $I = h_{12} W_{12}^3/12$; $L_{12}$, $W_{12}$, $h_{12}$ are the coupling beam length, width, and thickness, respectively; p is the density of polysilicon; and $C_{12}$ is given by:

$$C_{12} = (1+\beta^3)^2 \frac{\eta_z^2}{k_{s12}}. \tag{21}$$

Noise Analysis

Figure 12:
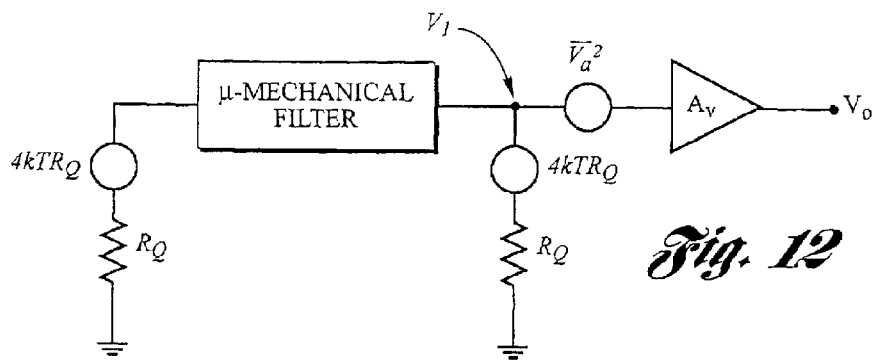
FIG. 12 is a schematic equivalent circuit of the system of the present invention used for noise analysis.

In order to find the minimum detectable angular rate, one can analyze the noise in the system using the equivalent circuit given in FIG. 12.

By substituting the total noise voltage $V_f$ (this is where the Coriolis output voltage is detected) into Equation (13) and solving for $\Omega$, one can find that the minimum detectable rate is:

$$\Omega_{min} = V_p \frac{\partial C}{\partial y} \frac{1}{\omega_o m_{rs} X} \sqrt{BW(2kTR_Q + V_a^2)}, \tag{22}$$

where $V_a$ is the equivalent input noise voltage of the amplifier and BW is the bandwidth of the low pass filter at the output. Similarly, for detection with high frequency carrier, substituting noise voltage in Equation (14) gives:

$$\Omega_{min} = \frac{V_p^2}{V_c} \frac{\partial C}{\partial y} \frac{1}{\omega_c m_{rs} X} \sqrt{BW(2kTR_Q + V_a^2)}, \tag{23}$$

Fabrication

The design gyroscope has been fabricated using a polysilicon surface micromachining process. This process is specifically designed for this gyroscope. It utilizes low stress silicon nitride as the insulating layer and the skeleton of the platform. The detailed process flow is given below with respect to FIGS. 13a–13l.

Figure 13A:
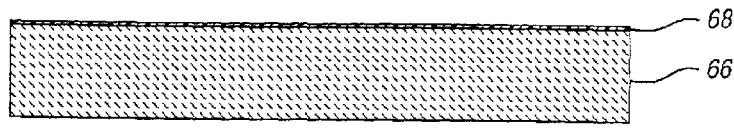
FIGS. 13a–13l are sectional views illustrating a polysilicon surface micromachining process flow for fabricating the gyroscope of the present invention.

In FIG. 13a, a silicon substance 66 is doped to form a doped region 68 at a top surface (n-type).

Figure 13B:

In FIG. 13b, a 2 μm layer 70 of $SiO_2$ is grown and trenches 72 are formed therein.

Figure 13C:

In FIG. 13c, a 0.3 μm polysilicon layer 74 is deposited.

Figure 13D:
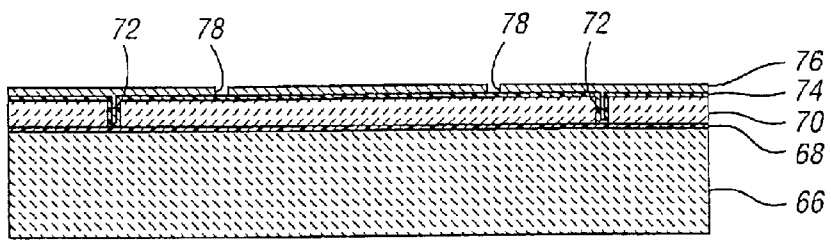

In FIG. 13d, a 1 μm layer 76 of low stress $Si_3N_4$ is deposited and trenches 78 are etched.

Figure 13E:
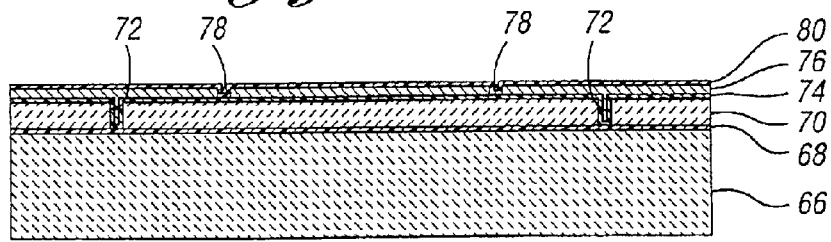

In FIG. 13e, a 0.3 μm layer 80 of polysilicon is deposited.

Figure 13F:
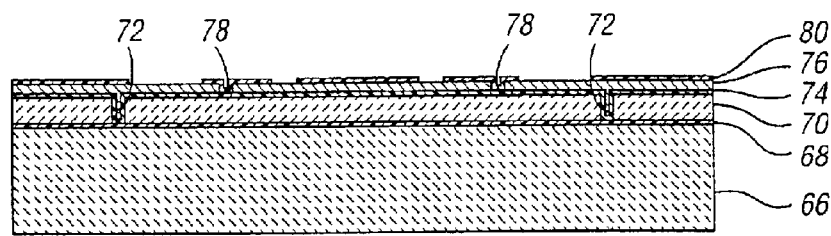

In FIG. 13f, the layer 80 is patterned and etched.

Figure 13G:
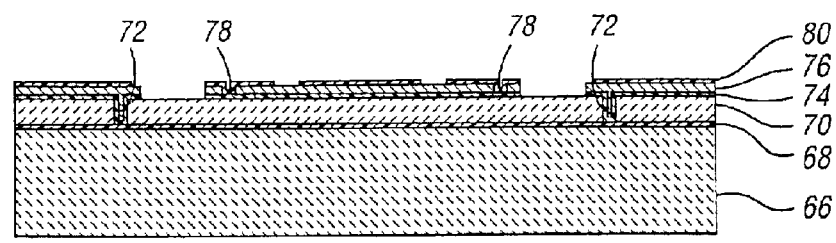

In FIG. 13g, the layers 74, 76 and 80 are etched and a platform is patterned.

Figure 13H:
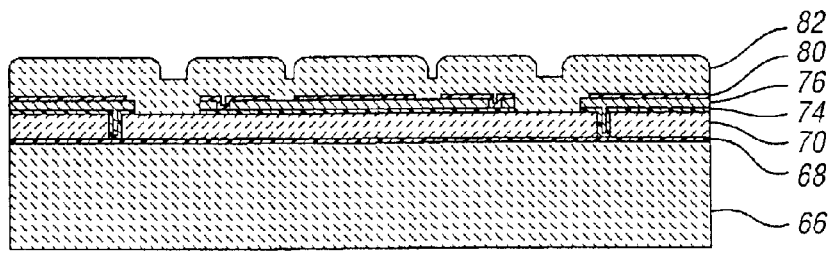

In FIG. 13h, a 4 μm layer 82 of $SiO_2$ is deposited.

Figure 13I:
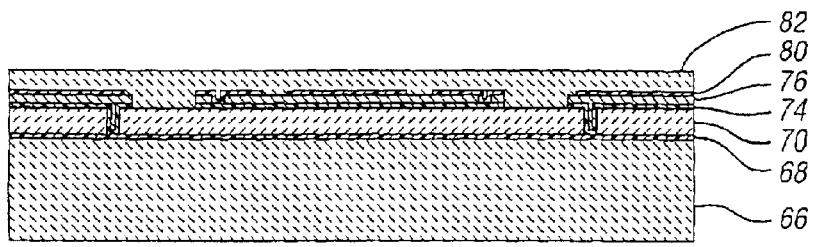

In FIG. 13i, the thickness of the layer 82 is reduced to 2 μm (by CMP).

Figure 13J:
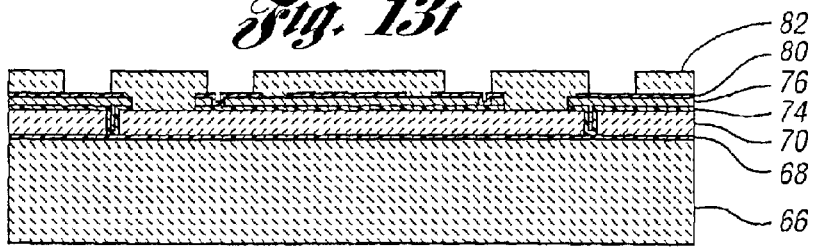

In FIG. 13j, the layer 82 is patterned and etched to form anchors.

Figure 13K:
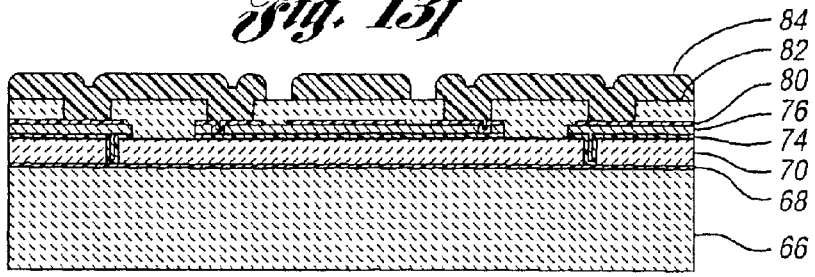

In FIG. 13k, a 2 μm layer 84 of structural polysilicon is deposited, patterned and etched.

Figure 13L:
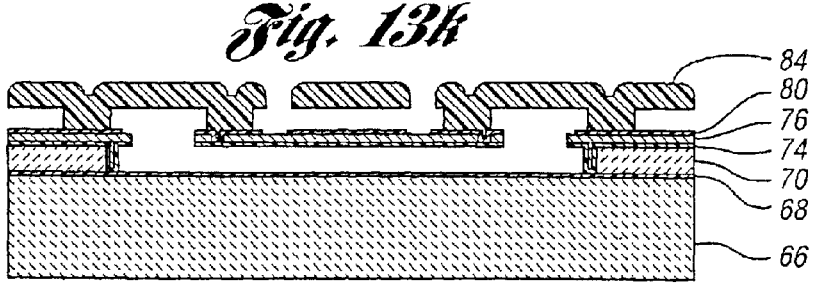

In FIG. 13l, the structure is released.

Figure 14:
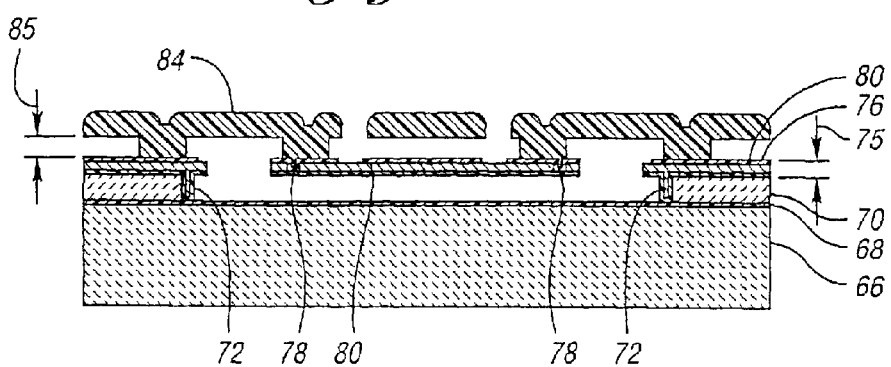
FIG. 14 is a final sectional view of the gyroscope.

The final cross-section of the structure is shown in FIG. 14. As seen in this Figure, the polysilicon beams support the nitride platform. The thin polysilicon top and bottom layers surround the nitride layer of the platform. The bottom poly layer is to avoid pull-in of the platform to the substrate. The top poly layer provides connections to the drive and sense mode electrodes. Thickness corresponding to reference number 75 is approximately 1.6 μm. Thickness corresponding to reference number 85 is approximately 2 μm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for measuring angular speed of an object, the method comprising:

providing a micromechanical filter apparatus including a first resonator having a first resonance frequency formed on a substrate, a second resonator and a third resonator comprising platform resonators, and means for coupling the second and third resonators so that the filter apparatus has a filter response in a sense mode with a substantially constant amplitude region for a passband of frequencies and the filter apparatus having a drive mode response in a drive mode;

coupling the substrate to the object so that the filter apparatus rotates with the object about a first axis;

driving the first resonator in the drive mode so that the first resonator vibrates along a second axis at a reference vibration and generates a Coriolis force which causes the second resonator to vibrate along a third axis at an induced vibration; and sensing the induced vibration in the sense mode to obtain a corresponding output signal which represents the angular speed of the object about the first axis wherein the passband of frequencies includes the first resonance frequency in the sense mode.

2. The method as claimed in claim 1 wherein the second resonator has a second resonance frequency and wherein the resonance frequencies are substantially the same in the drive and sense modes.

3. The method as claimed in claim 2 wherein the passband of frequencies includes the resonance frequencies and wherein the filter response of the filter apparatus in the sense mode is substantially constant about the resonance frequencies.

4. The method as claimed in claim 1 wherein the first resonator is comb-driven.

5. The method as claimed in claim 1 wherein the step of sensing is performed capacitively.

6. The method as claimed in claim 1 wherein Q-amplification is attained at a higher level in the drive mode than in the sense mode at the first resonance frequency.

7. The method as claimed in claim 1 wherein the resonators are polysilicon resonators.

8. The method as claimed in claim 1 wherein the means for coupling includes a mechanical spring for coupling the second and third resonators together.

9. The method as claimed in claim 1 wherein the filter apparatus is a wide passband filter apparatus and wherein the filter response is wider than the drive mode response.

10. The method of claim 1, wherein the passband of frequencies is substantially larger than a bandwidth of the first resonator so that frequency shifts in the first resonance frequency stay within the passband of frequencies.

11. The method of claim 1, wherein the filter apparatus includes a resistor coupled to the second resonator to obtain a desired filter response.

12. A system for measuring angular speed of an object, the system comprising:

a substrate;

a micromechanical filter apparatus including a first resonator having a first resonance frequency formed on the substrate, a second resonator and a third resonator comprising platform resonators, and means for coupling the second and third resonators so that the filter apparatus has a filter response in a sense mode with a substantially constant amplitude region for a passband of frequencies and having a drive mode response in a drive mode wherein the filter apparatus rotates with the object about a first axis when the substrate is coupled to the object and the object is rotated;

means for driving the first resonator in the drive mode so that the first resonator vibrates along a second axis at a reference vibration and generates a Coriolis force which causes the second resonator to vibrate along a third axis at an induced vibration; and means for sensing the induced vibration in the sense mode to obtain a corresponding output signal which represents the angular speed of the object about the first axis wherein the passband of frequencies includes the first resonance frequency in the sense mode.

13. The system as claimed in claim 12 wherein the second resonator has a second resonance frequency and wherein the resonance frequencies are substantially the same in the drive and sense modes.

14. The system as claimed in claim 13 the passband of frequencies includes the resonance frequencies and wherein the filter response of the filter apparatus in the sense mode is substantially constant about the resonance frequencies.

15. The system as claimed in claim 12 wherein the first resonator is comb-driven.

16. The system as claimed in claim 12 wherein the means for sensing includes a capacitor for capacitively sensing the induced vibration.

17. The system as claimed in claim 12 wherein Q-amplification is attained at a higher level the drive mode than in the sense mode at the first resonance frequency.

18. The system as claimed in claim 12 wherein the resonators are polysilicon resonators.

19. The system as claimed in claim 12 wherein the means for coupling include a mechanical spring for coupling the second and third resonators together.

20. The system as claimed in claim 12 wherein the filter apparatus is a wide passband filter apparatus and wherein the filter response is wider than the drive mode response.

21. The system of claim 12, wherein the passband of frequencies is substantially larger than the bandwidth of the first resonator so that frequency shifts in the first resonance frequency stay within the passband of frequencies.

22. The system of claim 12, wherein the filter apparatus includes a resistor coupled to the second resonator to obtain a desired frequency response.

* * * * *

UNITED STATES PATENT AND TRADEMARK OFFICE
CERTIFICATE OF CORRECTION

PATENT NO.   : 6,742,389 B2
DATED        : June 1, 2004
INVENTOR(S)  : Clark T.-C. Nguyen et al.

It is certified that error appears in the above-identified patent and that said Letters Patent is hereby corrected as shown below:

Column 11,
Line 36, delete "wide" before "passband".

Column 12,
Line 41, delete "wide" before "passband".

Signed and Sealed this

Sixteenth Day of November, 2004

JON W. DUDAS
*Director of the United States Patent and Trademark Office*